United States Patent [19]

Kimura et al.

[11] Patent Number: 4,705,953
[45] Date of Patent: Nov. 10, 1987

[54] RADIATION IMAGE RECORDING AND READ-OUT APPARATUS WITH OBJECT DATA OUTPUT CAPABILITY

[75] Inventors: Tsutomu Kimura; Yukio Watanabe, both of Kanagawa, Japan

[73] Assignee: Fuji Photo Film Co., Ltd., Kanagawa, Japan

[21] Appl. No.: 787,944

[22] Filed: Oct. 16, 1985

[30] Foreign Application Priority Data

Oct. 16, 1984 [JP] Japan ............................ 59-216902

[51] Int. Cl.$^4$ ............................................. G01T 1/105
[52] U.S. Cl. ................................ 250/484.1; 378/162; 378/165
[58] Field of Search .............. 250/327.2, 337, 484.1; 378/165, 162; 364/414

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,400,619 | 8/1983 | Kotera et al. | 250/327.2 |
| 4,543,479 | 9/1985 | Kato | 250/327.2 |
| 4,611,247 | 9/1986 | Ishida et al. | 358/280 |
| 4,641,242 | 2/1987 | Kimura | 364/414 |

FOREIGN PATENT DOCUMENTS 0011395 2/1981 Japan ............................ 250/327.2

Primary Examiner—Janice A. Howell
Assistant Examiner—Constantine Hannaher
Attorney, Agent, or Firm—Sughrue, Mion, Zinn, Macpeak & Seas

[57] ABSTRACT

A radiation image and read-out apparatus comprises a conveying means for circulating stimulable phosphor sheets along a predetermined circulation path, an image recording section for recording radiation images of objects on the sheets, an image read-out section for reading out the radiation images from the sheets, an erasing section for releasing radiation energy remaining on the sheets, a sheet position detection means for outputting sheet position data, an object data input section for receiving data related to the objects, and a signal output control circuit for receiving the object data and the sheet position data, storing the object data in association with the sheet positioned at the image recording section at the time the object data is received, reading out the object data stored in the memory means in association with the sheets at the time the radiation images are read out in the image read-out section, and outputting data signals corresponding to the object data for the respective sheets together with signals corresponding to the radiation images recorded thereon.

7 Claims, 1 Drawing Figure

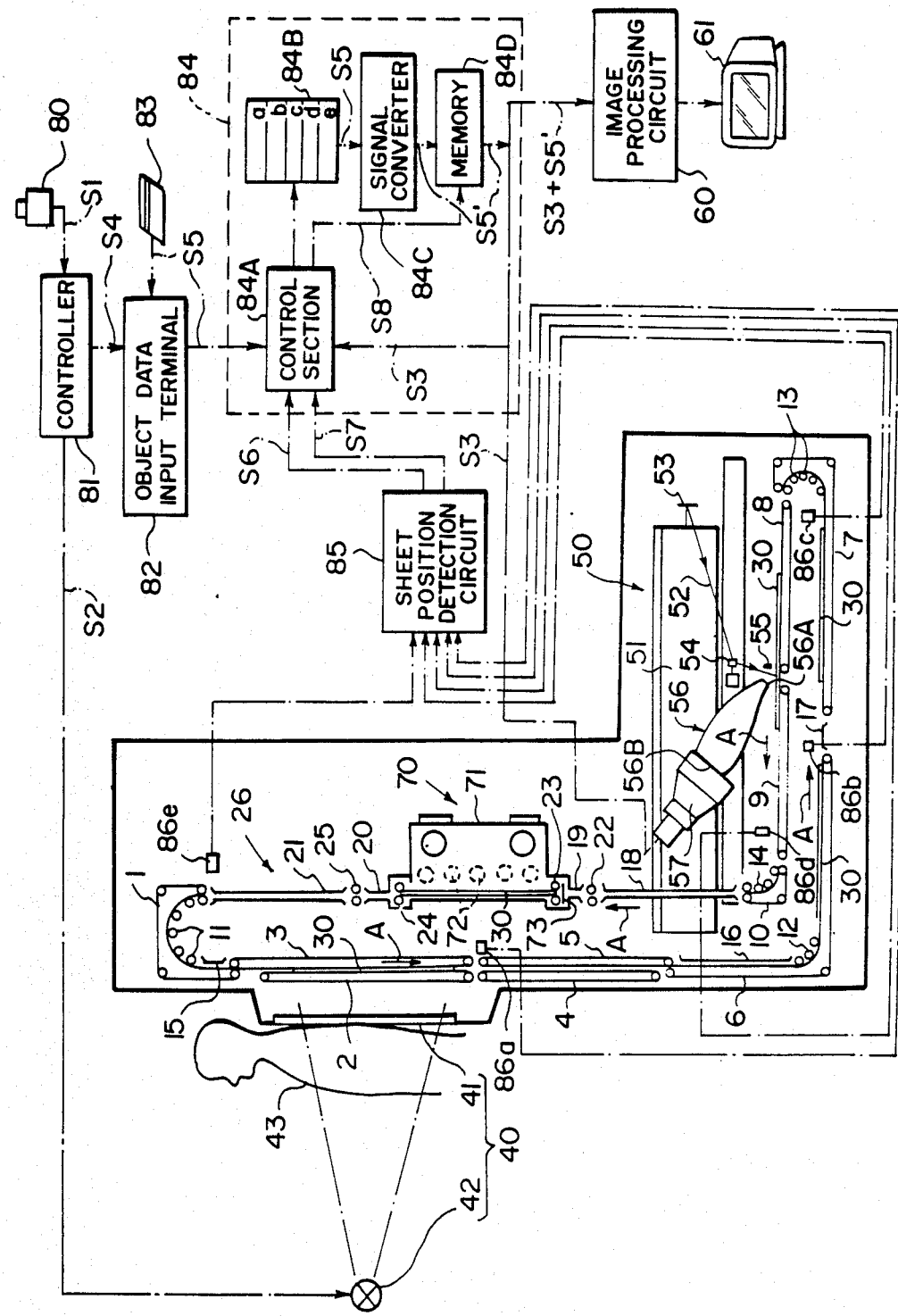

RADIATION IMAGE RECORDING AND READ-OUT APPARATUS WITH OBJECT DATA OUTPUT CAPABILITY

BACKGROUND OF THE INVENTION

1. Field of the Invention

This invention relates to a radiation image recording and read-out apparatus for exposing a stimulable phosphor sheet to a radiation passing through an object to have a radiation image of the object stored thereon, exposing the stimulable phosphor sheet to stimulating rays which cause it to emit light in proportion to the stored radiation energy, and detecting and converting the emitted light into electric signals. This invention particularly relates to a radiation image recording and read-out apparatus capable of circulating and reusing the stimulable phosphor sheets for recording radiation images and of outputting data related to the object together with the electric signals.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed for example in Japanese Unexamined Patent Publication Nos. 55(1980)-12429, 55(1980)-116340, 55(1980)-163472, 56(1981)-11395, and 56(1981)-104645, it has been proposed to use a stimulable phosphor in a radiation image recording and reproducing system. Specifically, a sheet comprising the stimulable phosphor (hereinafter referred to as a stimulable phosphor sheet) is first exposed to a radiation passing through an object such as a part of the human body to have a radiation image stored thereon, and then is scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed so as to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used only for temporarily storing the radiation image in order to reproduce the final visible image therefrom in a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for use in the aforesaid radiation image radiation recording and reproducing system and moves from place to place to record radiation images for. mass medical examinations, it is disadvantageous to load the mobile X-ray diagnostic station with a number of stimulable phosphor sheets, and the number of stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects in the stimulable phosphor sheets, transfer the electric image signals read out from the stimulable phosphor sheets onto a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining on the stimulable phosphor sheet after it is scanned with stimulating rays to read out the radiation image stored thereon should be eliminated or erased as described, for example, in Japanese Unexamined Patent Publication Nos. 56(1981)-11392 and 56(1981)-12599. The stimulable phosphor sheet can then be used again for radiation image recording.

The applicant therefore proposed in Japanese Patent Application No. 58(1983)-66730 a built-in type radiation image recording and read-out system apparatus comprising:

(i) a circulation and conveyance means for conveying at least one stimulable phosphor sheet for recording a radiation image thereon along a predetermined circulation path, (ii) an image recording section positioned on said circulation path for recording a radiation transmission image of an object on said stimulable phosphor sheet by exposing said stimulable phosphor sheet to a radiation passing through said object, (iii) an image read-out section positioned on said circulation path and consisting of a stimulating ray source for emitting stimulating rays for scanning said stimulable phosphor sheet carrying said radiation image stored thereon in said image recording section, and a photoelectric read-out means for detecting light emitted from said stimulable phosphor sheet scanned with said stimulating rays to obtain an electric image signal, and (iv) an erasing section for, prior to the next image recording on said stimulable phosphor sheet for which the image read-out has been conducted in said image read-out section, releasing the radiation energy remaining on said stimulable phosphor sheet;

whereby said stimulable phosphor sheet is circulated through said image recording section, said image read-out section and said erasing section and reused for radiation image recording.

On the other hand, in the recording of a radiation image of an object (a part of the human body) it is common practice to stamp pertinent data regarding the object into the lead plate attached to the X-ray film cassette and then at the time of reproducing a visible image of the object to refer to this object data, which may include the name of the person, the body portion X-rayed, the date of X-raying, etc., in order to realize higher diagnostic efficiency.

With the built-in type radiation image recording and read-out apparatus described in the aforesaid Japanese patent application, however, since the stimulable phosphor sheets are circulated and reused, it is impossible to record the object data directly on the stimulable phosphor sheets or their cases etc.

SUMMARY OF THE INVENTION

The primary object of the present invention is to provide a built-in type radiation image recording and read-out apparatus capable of outputting object data so as to permit the indication of the object data together with the reproduced visible image.

The present invention provides a built-in type radiation image and read-out apparatus with object data output capability comprising:

(i) a circulation and conveyance means for conveying stimulable phosphor sheets along a predetermined circulation path, (ii) an image recording section for recording a radiation image of an object on each of said stimulable phosphor sheets, (iii) an image read-out section for reading out the radiation images recorded on said stimulable phosphor sheets in said image recording section, (iv) an erasing section for releasing radiation energy remaining in the stimulable phosphor sheets after read-out in said image read-out section, (v) a sheet position detection means for detecting which of the stimulable phosphor sheets are positioned in the image recording section and the image read-out section and outputting corresponding sheet position data, (vi) an object data input section for receiving data related to the objects whose radiation images are to be recorded and for outputting the object data related to each object at the time its radiation image is recorded, and (vii) a signal output control circuit for receiving the object data output by the object data input section and the sheet position data output by the sheet position detection means, storing the object data in a memory means in association with the stimulable phosphor sheet positioned at the image recording section at the time the object data is received, reading out the object data stored in the memory means in association with the respective stimulable phosphor sheets at the time the radiation images are read out from the respective stimulable phosphor sheets in the image read-out section, and outputting data signals corresponding to the object data for the respective stimulable phosphor sheets together with signals corresponding to the radiation images recorded thereon.

BRIEF DESCRIPTION OF THE DRAWING

The single FIGURE is a schematic side view of an embodiment of the radiation image recording and read-out apparatus in accordance with the present invention.

DESCRIPTION OF THE PREFERRED EMBODIMENT

The present invention will hereinbelow be described in further detail with reference to the accompanying drawings.

Referring to the FIGURE, the radiation image recording and read-out apparatus is provided with a sheet circulation and conveyance means 26 comprising endless belts 1, 2, 3, 4, 5, 6, 7, 8, 9 and 10, guide rollers 11, 12, 13 and 14 rotated respectively by the endless belts 1, 6, 7 and 10, guide plates 15, 16, 17, 18, 19, 20 and 21, and nip rollers 22, 23, 24, 25. In the sheet circulation and conveyance system, by way of example, five stimulable phosphor sheets are conveyed and circulated in spaced relation to each other in the direction as indicated by the arrow A by the endless belts 1-10 and the nip rolls 22-25.

The endless belts 1 and 2 are disposed so as to hold the stimulable phosphor sheets 30 vertically therebetween, and an image recording table 41 is positioned to the side (left side in the drawing) of the endless belts 1 and 2. A radiation source 42, e.g. an X-ray source, is spaced from the image recording table 41 to stand face to face with the endless belts 2 and 3. An image recording section 40 is constituted by the image recording table 41 and the radiation source 42. When a radiation image of an object 43 is recorded on the sheet 30, the sheet 30 is held between the endless belts 2 and 3 as shown in the drawing, and the radiation source 42 is activated with the object 43 positioned in front of the image recording table 41. In this way, the sheet 30 is exposed to a radiation passing through the object 43 to have a radiation image of the object 43 stored in the sheet 30. In this case, the radiation source 42 is activated by operating a record switch 80, causing it to forward a record signal to a controller 81 which in response applies an activating current S2 to the radiation source 42.

An image read-out section 50 is positioned at the lower right end of the sheet circulation and conveyance system 26. At the image read-out section 50, a laser beam source 51 is positioned above the endless belt 8 constituting a part of the image read-out section 50, and a mirror 53 and a galvanometer mirror 54 are positioned for scanning a laser beam 52 emitted by the laser beam source 51 in the width direction of the sheet 30 placed on the endless belt 8. The galvanometer mirror 54 is swung in both directions to scan the laser beam 52 in the main scanning direction on the sheet 30 carrying the radiation image stored thereon. The sheet 30 has been subjected to image recording at the image recording section 40 and then conveyed by the sheet circulation and conveyance means 26 to the image read-out section 50. A light guiding reflection mirror 55 and a light guide member 56 are positioned along the main scanning direction at the scanning portion of the laser beam 52 on the sheet 30. When the sheet 30 is exposed to the laser beam 52, the sheet 30 emits light in proportion to the stored radiation energy. The light emitted by the sheet directly toward the light guide member 56 and the light emitted thereby and reflected by the light guiding reflection mirror 55 both enter the light guide member 56 from a light input face 56A thereof, and are guided inside of the light guide member 56 through total reflection to a light output face 56B thereof. The light is thus detected by a photomultiplier 57 connected to the light output face 56B of the light guide member 56. Simultaneously with the scanning of the sheet 30 by the laser beam 52 in the main scanning direction, the sheet 30 is moved by the endless belt 8 in the sub-scanning direction, as indicated by the arrow A, approximately normal to the main scanning direction, so that the radiation image information is read out from the whole surface of the sheet 30. An electric image signal S3 obtained from the photomultiplier 57 is sent to an image processing circuit 60 for processing the electric image signal as required. The image signal thus processed is then sent to an image reproducing apparatus 61. The image reproducing apparatus may be a display device such as a CRT, or a device for recording a visible image by point-by-point scanning on a photographic film. Or, the image signal may be stored in a storage means such as a magnetic tape.

As will be explained in more detail later, the electric image signal S3 is not forwarded directly to the image processing apparatus 60 but is sent thereto via a signal output control circuit 84.

After image read-out is finished, the sheet 30 is conveyed by the endless belts 9 and 10 to pass between the guide plates 18 to the nip rollers 22, from where it is fowarded through the nip rollers 22 and 23 to an erasing section 70. The erasing section 70 comprises a case 71 and many erasing light sources 72, e.g. fluorescent lamps, arranged within the case 71. After a shutter 73 is opened, the sheet 30 is conveyed into the case 71 by the nip rollers 23. Then the shutter 73 is closed, and the erasing light sources 72 are turned on. The erasing light sources 72 mainly emit light having a wavelength within the stimulation wavelength range for the stimulable phosphor of the sheet 30. When the sheet 30 is exposed to the erasing light, the radiation energy remaining in the sheet 30 after the image read-out is released. At this time, since the shutter 73 is closed, no noise is generated in the read-out signal by erasing light leaking into the image read-out section 50. After the radiation energy remaining in the sheet 30 is erased to such an extent that the next image recording on the sheet 30 is possible, the nip rollers 24 are rotated and the sheet 30 is conveyed out of the erasing section 70. Then the sheet is conveyed between the guide plates 20 to the nip rollers 25, which further convey it between the guide plates 21 to the endless belt 1. The sheet 30 is then conveyed to the image recording section 40 in the same manner as described earlier and is again used for recording a radiation image.

When the controller 81 forwards the activating current S2 to the radiation source 42 it simultaneously outputs an exposure timing signal S4 to an object data input terminal 82. The object data input terminal has an internal memory (not shown) for storing object data S5 related to the object 43 whose radiation image is to be recorded on the sheet 30. The object data S5 is input to the object data input terminal beforehand from a recording medium 83 which may, for example, be a magnetic card. Then when the object data input terminal 82 receives the timing signal S4, i.e. at the time the radiation image of the object 43 is recorded, it forwards the object data S5 stored therein to a control section 84A of the signal output control circuit 84. The control section 84A also receives sheet position signals S6 and S7 from a sheet position detection circuit 85 which, together with five sensors 86a, 86b, 86c, 86d and 86e disposed along the path of the circulation and conveyance means 26 at the positions shown in the drawing, constitutes a sheet position detection means. More specifically, after the sheet position detection circuit 85 has been supplied with data regarding the initial positions of the respective sheets 30, it is able to track the flow of the sheets along the circulation path 26 on the basis of outputs indicating the passage of the sheets received from the sensors 86a to 86e. It is thus able to determine the positions of the respective sheets 30 at each instant and to output the sheet position signals S6 and S7 indicating which of the five sheets 30 is located at the image recording section 40 and which is located at the image read-out section 50, respectively.

As described earlier, the control section 84A of the signal output control circuit 84 receives the object data signal S5 at the time the radiation image of the object 43 is recorded on one of the sheets 30. Then, it stores the object data S5 in a memory 84B having five addresses a, b, c, d and e each of which is associated with one of the five sheets 30, the address selected for storing the object data S5 at this time being the one associated with the sheet currently at the image recording section 40 as determined with reference to the sheet position signal S6.

The control section also receives the electric image signal S3 output by the photomultiplier 57 at the time the radiation image is read out from the sheet 30 in the image read-out section 50. When the control section 84A receives the electric image signal S3, it issues an access command signal to the memory 84 for reading out the object data S5 stored at the address for the sheet 30 indicated by the sheet position signal S7 as being located at the image read-out section 50. The read-out object data S5 is forwarded to a signal converter 84C which converts it into data signal S5' of the same format as the electric image signal S3. The data signal S5' is then stored in a memory 84D. Upon detecting from the electric image S3 that image read-out has been completed, the control section 84A allows a prescribed period of time to pass and then issues a command signal S8 to the memory 84, thereby causing the memory 84 to forward the data signal S5' to the transmission path for the electric image signal S3.

As a result, the data signal S5' carrying information related to the object 43 is input to the image reproducing apparatus 61 via the image processing circuit 60 immediately after the electric image signal S3 has been input thereto. Thus, the object data relating to the object 43 is reproduced together with the reproduced radiation image either as a visible image on a CRT or in the form of a hard copy, depending on what type of device is used for the image reproducing apparatus 61.

The apparatus according to the present invention enables a substantial improvement in the diagnostic efficiency of radiation images since it makes it possible to display or record the radiation image of the object 43 together with pertinent data relating thereto.

In the aforesaid embodiment, the radiation image is displayed or recorded before the object data. However, it is also possible to output the data signal S5' carrying information relating to the object 43 from the signal output control circuit 84 before the electric image signal is sent to the image processing circuit 60, in which case the radiation image will be displayed or recorded after the object data.

Also, although in the aforesaid embodiment the number of stimulable phosphor sheets disposed along the circulation path 26 is specified as five, it is of course possible to dispose a larger or smaller number of sheets than five.

We claim:

1. A radiation image recording and read-out apparatus with object data output capability comprising:
   (i) a circulation and conveyance means (26) for conveying at least one stimulate phosphor sheet (30) for recording a radiation image thereon along a predetermined circulation path,
   (ii) an image recording section (40) positioned on said circulation path for recording a radiation transmission image of an object (43) on said stimulable phosphor sheet by exposing said stimulate phospher sheet to a radiation passing through said object, (iii) an image read-out section (50) positioned on said circulation path and consisting of a stimulating ray source (51) for emitting stimulating rays (52) for scanning said stimulable phosphor sheet carrying said radiation image stored thereon in said image recording section, and a photoelectric read-out means (56,57) for detecting light emitted from said light stimulable phosphor sheet scanned with said stimulating rays to obtain an electric image signal (53).

(iv) an erasing section (70) for, prior to the next image recording on said stimulable phosphor sheet for which the image read-out has been conducted in said image read-out section, releasing the radiation energy remaining on said stimulable phosphor sheet, (v) a sheet position detection means (85,86) for detecting which of the stimulable phosphor sheets are positioned in the image recording section and the image read-out section and outputting corresponding sheet position data (56,57), (vi) an object data input section (82) for receiving data (55) related to the objects whose radiation images are to be recorded and for outputting the object data related to each object at the time its radiation image is recorded, and (vii) a signal output control circuit (84) for receiving the object data output by the object data input section and the sheet position data output by the sheet position detection means, storing the object data in a memory means (84B) in association with the stimulable phosphor sheet positioned at the image recording section at the time the object data is received based on the sheet position data received from the sheet position detection means, reading out the object data stored in the memory means in association with the respective stimulable phosphor sheets at the time the radiation images are read out from the respective stiumulable phosphor sheets in the image read-out section, and outputting data signals (55) corresponding to the object data for the respective stimulable phosphor sheets together with signals (53) corresponding to the radiation images recorded thereon.

2. An apparatus as defined in claim 1 wherein said sheet position detection mens is provided with sheet position sensors (86), disposed at the image recording section and the image read-out section, for detecting the presence of a sheet, and a sheet position detection circuit (85) for processing detection signals from the sheet position sensors to determine when stimulable phosphor sheets have entered the image recording section and the image read-out section.

3. An apparatus as defined in claim 1 wherein said memory means has a number of addresses equal to the number of stimulable phosphor sheets circulated by said circulation and conveyance means.

4. An apparatus as defined in claim 3 wherein each memory address is used for storing object data for a specific one of said stimulable phosphor sheets.

5. A radiation image recording and read-out apparatus with object data output capability comprising:

(i) a circulation and conveyance means (26) for conveying at least one stimulable phosphor sheet (30) for recording a radiation image thereon along a predetermined circulation path, (ii) an image recording section (40) positioned on said circulation path for recording a radiation transmission image of an object (43) on said stimulable phospor sheet by exposing said stimulable phosphor sheet to a radiation passing through said object, (iii) an image read-out section (50) positioned on said circulation path and consisting of a stimulating ray source (51) for emitting stimulating rays (52) for scanning said stimulable phosphor sheet carrying said radiation image stored thereon in said image recording section, and a photoelectric read-out means (56,57) for detecting light emitted from said light stimulable phosphor sheet scanned with said stimulating rays to obtain an electric image signal (53), (iv) an erasing section (70) for, prior ot the next image recording on said stimulable phosphor sheet for which the image read-out has been conducted in said image read-out section, releasing the radiation energy remaining on said stimulable phosphor sheet, (v) a sheet position detection means (85,86) for detecting which of the stimulable phosphor sheets are positioned in the image recording section and the image read-out section and outputting corresponding sheet position data (56,57), (vi) an object data input section (82) for receiving data (55) related to the objects whose radiation images are to be recorded and for outputting the object data related to each object at the time its radiation image is recorded, and (vii) a signal output control circuit (84) for receiving the object data output by the object data input section and the sheet position data output by the sheet position detection means, storing the object data in a memory means (84B) in association with the stimulable phosphor sheet positioned at the image recording section at the time the object data is received based on the sheet position data received from the sheet position detection means, reading out the object data stored in the memory means in association with the respective stimulable phosphor sheets at the time the radiation images are read out from the respective stimulable phosphor sheets in the image read-out section, and outputting data signals (55) corresponding to the object data for the respective stimulable phosphor sheets together with signals (53) corresponding to the radiation images recorded thereon, wherein said sheet position detection means is provided with sheet position sensors, disposed at the image recording section and the image read-out section, for outputting detection signals indicative of the presence of a sheet, and a sheet position detection circuit for receiving the detection signals and determining when a particular one of said sheets is at the image recording section and when the particular one of said sheets is at the image read-out section based upon the detection signals received from the particular one of said sheets and others of said sheets.

6. An apparatus as defined in claim 5 wherein said memory means has a number of addresses equal to the number of stimulable phosphor sheets circulated by said circulation and conveyance means.

7. An apparatus as defined in claim 6 wherein each memory address is used for storing object data for a specific one of said stimulable phosphor sheets.

* * * * *